United States Patent [19]
Kroscher

[11] Patent Number: 5,887,751
[45] Date of Patent: Mar. 30, 1999

[54] DETACHABLE COOKWARE HANDLE

[75] Inventor: Todd W. Kroscher, Two Rivers, Wis.

[73] Assignee: Newell Operating Company, Freeport, Ill.

[21] Appl. No.: 943,258

[22] Filed: Oct. 3, 1997

[51] Int. Cl.⁶ .................................................. B65D 25/28
[52] U.S. Cl. ........................ 220/759; 220/770; 220/573.1
[58] Field of Search .................................. 220/759, 573.1, 220/753, 769, 770

[56] References Cited

U.S. PATENT DOCUMENTS

| | | | |
|---|---|---|---|
| 1,015,176 | 1/1912 | Hall et al. ................................ | 220/759 |
| 1,627,880 | 5/1927 | Baxter . | |
| 2,073,475 | 3/1937 | Gordon . | |
| 2,262,273 | 11/1941 | Ferrara . | |
| 2,362,720 | 11/1944 | Reichart . | |
| 3,203,029 | 8/1965 | Serio . | |
| 3,342,517 | 9/1967 | Pryce . | |
| 3,347,404 | 10/1967 | McIntyre ................................. | 220/759 |
| 3,420,401 | 1/1969 | Maslow . | |
| 4,206,853 | 6/1980 | Iten et al. ................................ | 220/759 |
| 5,086,939 | 2/1992 | Foulkes, Jr. . | |
| 5,431,294 | 7/1995 | Stottmann et al. ..................... | 220/759 |

FOREIGN PATENT DOCUMENTS

| | | | |
|---|---|---|---|
| 1 408 860 | 7/1965 | France .................................... | 220/759 |
| 554 297 | 5/1958 | Italy ....................................... | 220/759 |

*Primary Examiner*—Stephen Castellano
*Attorney, Agent, or Firm*—Foley & Lardner

[57] ABSTRACT

A detachable handle for a cooking vessel having at least one attachment opening formed therein includes an elongate member and a vessel engaging portion. The vessel engaging portion is attached to a first end of the elongate member and is adapted to engage at least one of the attachment openings of the cooking vessel. The detachable handle further includes a locking mechanism for securing the detachable handle to the cooking vessel.

19 Claims, 3 Drawing Sheets

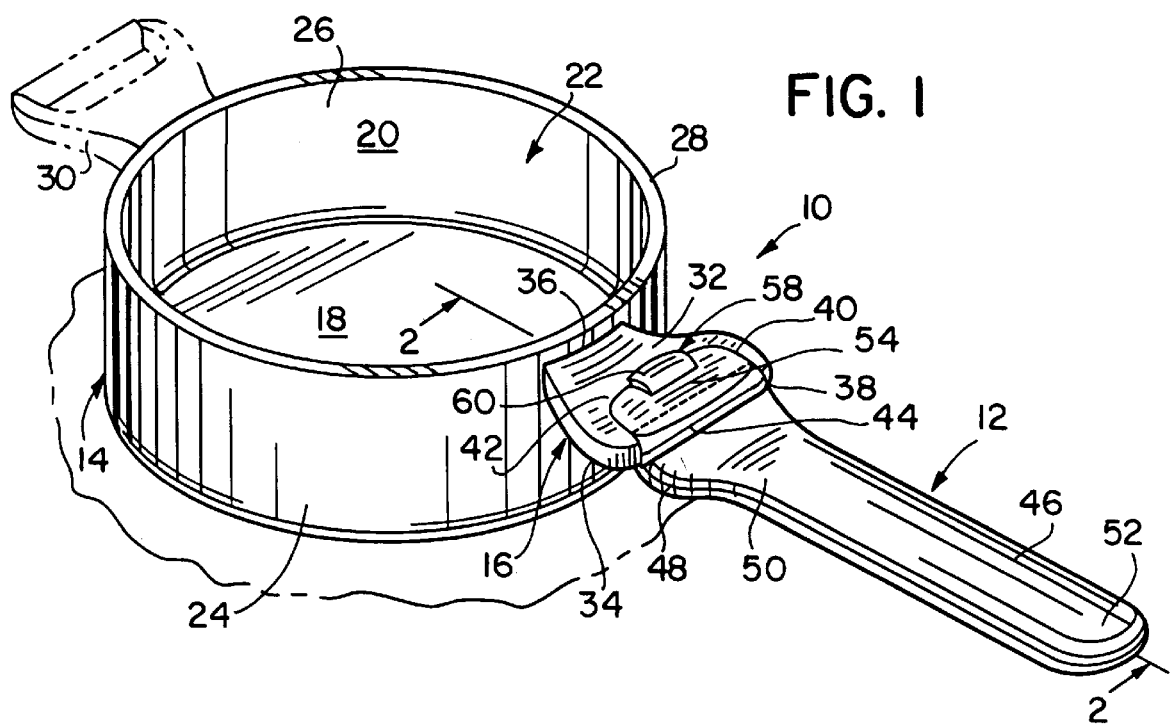
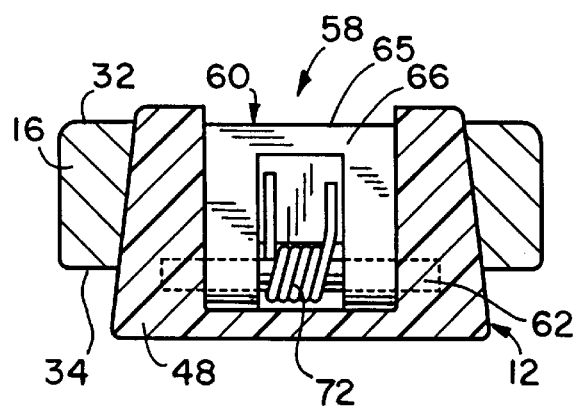
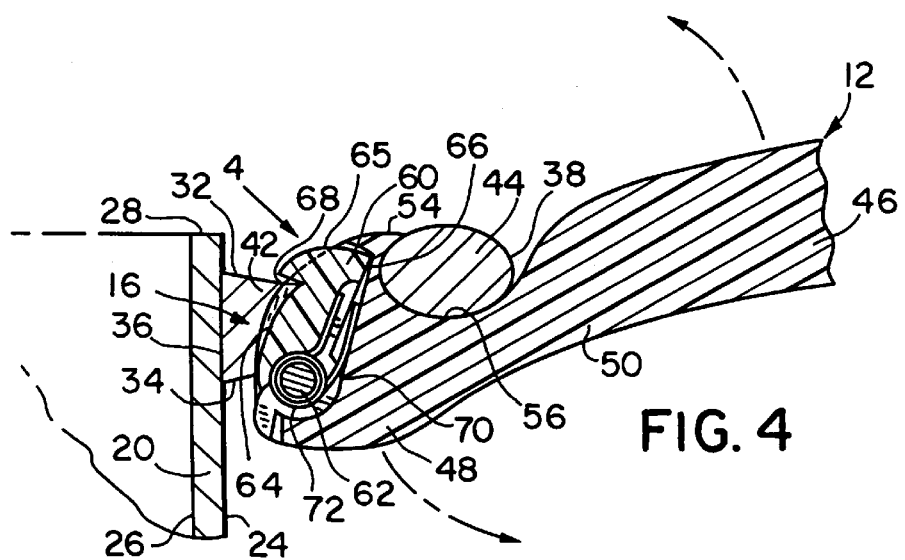

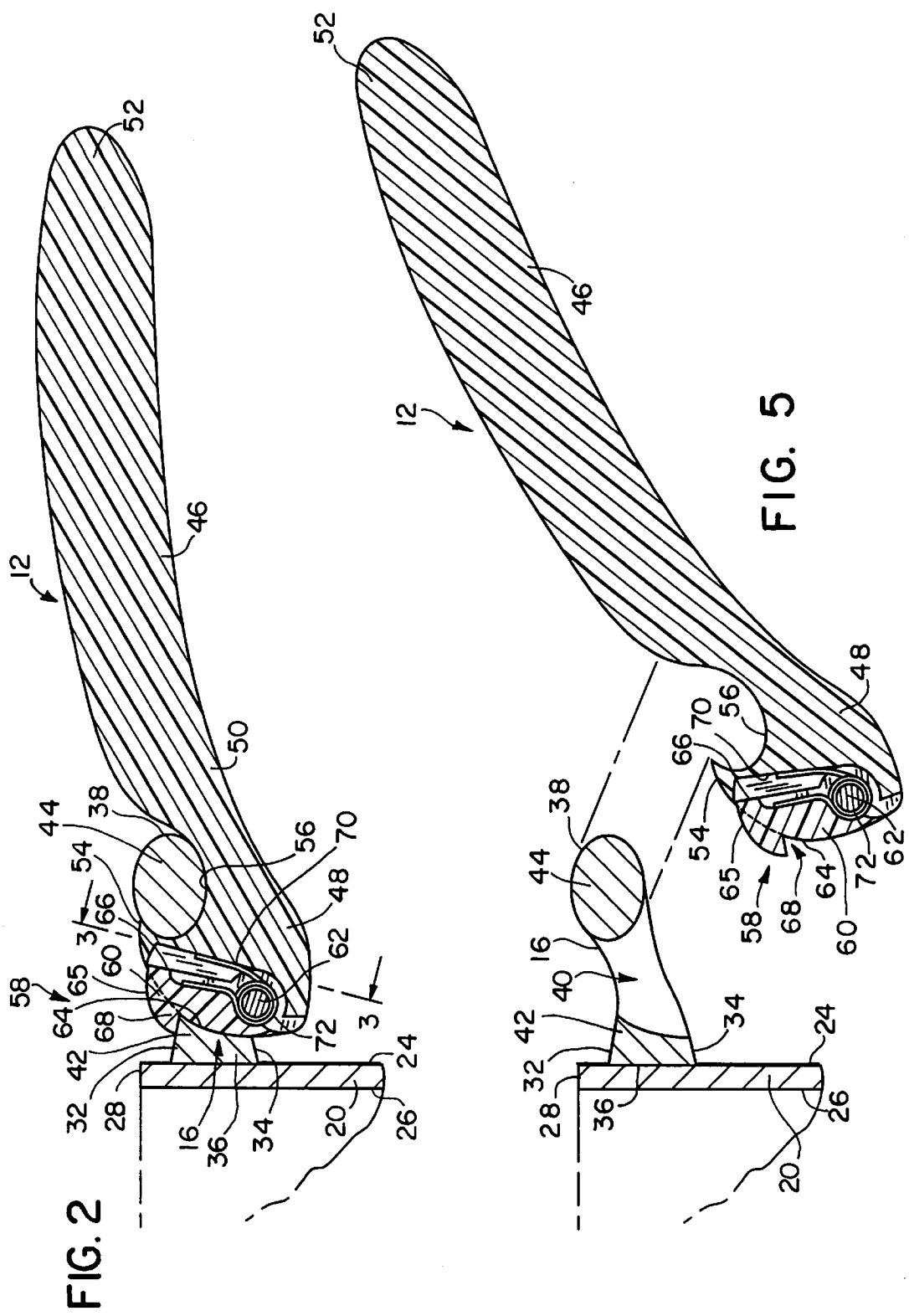

DETACHABLE COOKWARE HANDLE

FIELD OF THE INVENTION

The present invention relates to a cooking or baking vessel, such as a pot or pan. More particularly, the present invention relates to a cooking or baking vessel having a handle removably attached to the vessel and a locking mechanism for locking the handle onto the vessel.

BACKGROUND OF THE INVENTION

In general, detachable handles for cooking or baking vessels, such as pots and pans, are well known. Pots and pans with detachable handles require less space, as the handles may be removed and placed inside the pots or pans, thereby enabling the pots and pans to be stored closer together. Many prior art detachable handles include a pair of opposing, tong-like members which grip the upper rim of a pot or pan. Because the upper rim is generally not very wide, the detachable handle has only a small surface area with which to grasp, making it difficult for the handle to attach securely to the pan. As a result, the connection between the handle and the pan is unstable.

Attempts to improve these detachable handles include extending the portion of the tongs which engages the rim of the cooking vessel to grasp a part of the side wall of the cooking vessel. For example, in one such device a planar surface extends down from each member of the tongs toward the bottom of the cooking vessel when the handle is attached to the vessel. While this approach improves the connection between the handle and the cooking vessel, the planar surface extension of the handle located on the inside of the vessel may interfere with food in the pot or pan.

Other versions of detachable handles are designed to engage a lug permanently attached to the cooking vessel. These handles typically include a lug engaging portion of dimensions slightly larger than the thickness of the lug. When the handle is attached to the vessel, the handle encompasses the lug and clamps down on the top and bottom surfaces of the lug. One problem with these detachable handles is that, because the handle covers the lug, the handle tends to be rather bulky.

Still another type of detachable handle engages permanent handles mounted on the sides of a pot or pan. One end of the detachable handle is shaped like a hook and is designed to be inserted into an open space in the permanent handles. A disadvantage with this detachable handle is that, since the handle does not have a lock, the handle may be accidentally disconnected or removed from the pot or pan. As a result, the handle does not provide a secure connection with the pot or pan.

In light of the foregoing, it is desirable to provide a sleek and attractive handle which may be easily attached to and removed from a cooking or baking vessel and which does not interfere with the vessel's contents. In addition, it is desirable to provide a locking mechanism for attaching the handle to the vessel.

SUMMARY OF THE PRESENT INVENTION

In accordance with one aspect of the present invention a detachable handle for a vessel having at least one attachment opening formed therein includes an elongate member having opposed first and second ends and a vessel engaging portion attached to the first end. The vessel engaging portion is adapted to engage at least one of the attachment openings of the vessel. The detachable handle further includes a locking mechanism for securing the detachable handle to the vessel.

In accordance with another aspect of the invention, a vessel for cooking or baking is provided with a receptacle including an upwardly extending side wall and a side handle permanently attached to the side wall. The side handle has an opening formed therein. The vessel further includes a handle removably coupled to the side handle. The removable handle includes an elongate member having opposed first and second ends and a vessel engaging portion attached to the first end. The vessel engaging portion engages the side handle. The removable handle further includes a locking mechanism for securing the handle to the receptacle.

In accordance with still another aspect of the invention, a vessel for cooking or baking includes a receptacle and a handle. The receptacle has an upwardly extending side wall having at least two openings formed therein. The handle is removably coupled to the side wall and includes an elongate member having opposed first and second ends. The handle further includes a vessel engaging portion attached to the first end of the elongate member. The vessel engaging portion has a plurality of prongs which project from a front end, each prong engaging the respective opening of the receptacle.

Other principal features and advantages of the invention will become apparent to those skilled in the art upon review of the following drawings, the detailed description and the appended claims.

BRIEF DESCRIPTION OF THE DRAWINGS

The present invention will become more fully understood from the following detailed description, taken in conjunction with the accompanying drawings, wherein like reference numerals denote like elements, in which:

FIG. 1 is a perspective view of a cooking vessel showing one embodiment of a detachable handle in accordance with the invention;

FIG. 2 is a cross-sectional view taken generally along line 2—2 of FIG. 1 illustrating a locking mechanism which secures the detachable handle to the cooking vessel;

FIG. 3 is a cross-sectional view taken generally along line 3—3 of FIG. 2 in which a latch of the locking mechanism is depressed to prepare for removal of the detachable handle from the cooking vessel;

FIG. 4 is a partial sectional view of the cooking vessel shown in FIG. 2;

FIG. 5 is a view of the cooking vessel shown in FIG. 2, with the handle removed from the vessel;

DETAILED DESCRIPTION OF A PREFERRED EXEMPLARY EMBODIMENT

Figure 6:
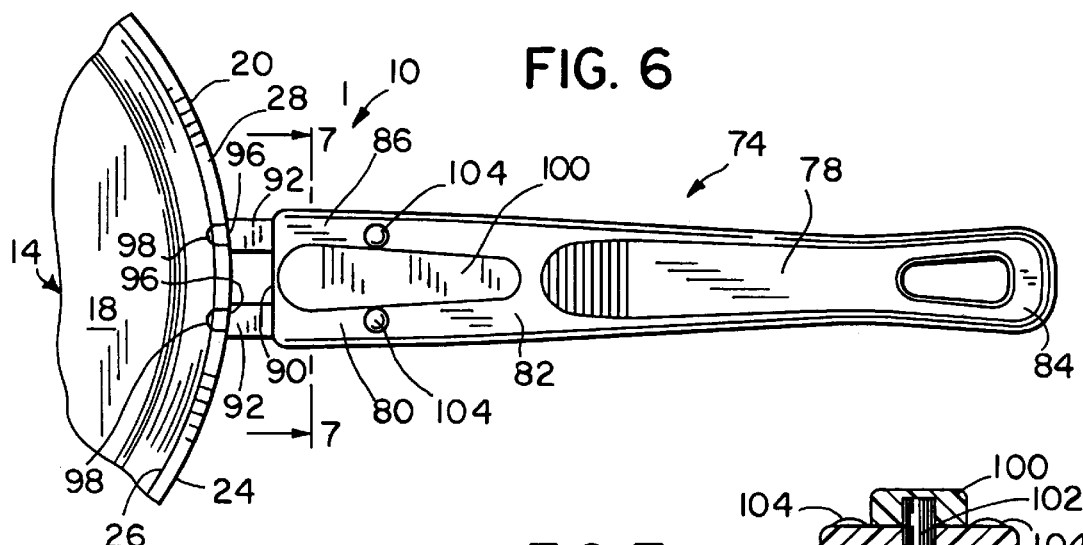
FIG. 6 is a plan view of a cooking vessel with a second embodiment of a detachable handle in accordance with the invention.
Figure 7:
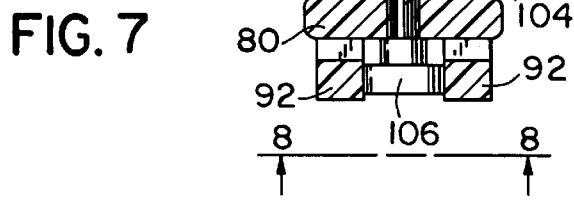
FIG. 7 is a cross-sectional view taken generally along line 7—7 of FIG. 6.

Referring generally to FIG. 1, an exemplary vessel 10 for cooking or baking is provided with a detachable handle 12 in accordance with a first embodiment of the present invention. Vessel 10, such as a pot or a pan, includes a receptacle 14 having a side handle 16 to which detachable handle 12 is coupled.

Receptacle 14 of cooking or baking vessel 10 has a bottom 18 and an upwardly extending side wall 20 which define an interior cooking region 22. Side wall 20 has an outer face 24, an inner face 26 and a rim 28. Attached to outer face 24 is side handle 16. Receptacle 14 may also include a second side handle 30, shown in phantom lines, disposed opposite side handle 16. Second side handle 30 may be identical to side handle 16, although different configurations and locations of handle 30 are possible.

As best illustrated in FIG. 5, side handle 16 has top and bottom faces 32 and 34, respectively, and a first end 36 which may be attached to side wall 20 of receptacle 14 by a screw (not shown) or other mechanical fastener. Alternatively, side handle 16 may be integrally formed with side wall 20 of receptacle 14. Side handle 16 also has a free second end 38 located opposite first end 36. Disposed between first and second ends 36 and 38, respectively, an opening 40 is formed in side handle 16 for receiving detachable handle 12. Opening 40 is bounded by a ledge 42 located on top face 32 proximate first end 36 and a bar 44 located along second end 38. In the preferred embodiment of the invention, bar 44 is generally cylindrical and acts as a pivot when detachable handle 12 is coupled to receptacle 14. However, bar 44 may have other appropriate configurations.

Detachable handle 12, as illustrated in FIGS. 1–5, includes an elongate member 46 and a vessel engaging portion 48. Elongate member 46 has a first end 50 and a second end 52 disposed opposite first end 50. Elongate member 46 provides a user with a grip for operating handle 12. Attached to first end 50 of elongate member 46 is vessel engaging portion 48. In the preferred embodiment vessel engaging portion 48 and elongate member 46 are integrally formed of a durable plastic material. In the alternative, vessel engaging portion 48 may be attached to elongate member 46 by a mechanical fastener or an adhesive.

Vessel engaging portion 48 engages side handle 16 when handle 12 is attached to receptacle 14. Vessel engaging portion 48 includes a notch 56 formed therein which is configured to receive bar 44 of side handle 16, when detachable handle 12 is coupled to receptacle 10. In addition, vessel engaging portion 48 has an upper surface 54 which is received in opening 40 of side handle 16. Upper surface 54 preferably has a convex curvature which provides handle 12 with a sleek appearance.

Detachable handle 12 further includes a locking mechanism 58 for locking handle 12 to side handle 16 while in use. Locking mechanism 58 is preferably designed to secure detachable handle 12 to side handle 16 automatically when upper surface 54 of vessel engaging portion 48 is inserted into opening 40. Locking mechanism 58 includes a latch 60 pivotally coupled to vessel engaging portion 48 by a pivot pin 62. Latch 60 has a front face 64 and a back face 66. Front face 64 of latch 60 includes a groove 68 formed therein which mates with ledge 42 of side handle 16. Latch 60 pivots about pin 62 and is biased away from a front face 70 of vessel engaging portion 48 by a torsional spring 72. Front face 64 of latch 60 has a convex upper portion 65 which combines with upper surface 54 of vessel engaging portion 48 to fill opening 40, thereby providing a secure connection between detachable handle 12 and side handle 16. As a result, when detachable handle 12 is used to lift receptacle 14, receptacle 14 will not wobble.

Thus, detachable handle 12 is attached to receptacle 14 as follows. As shown in FIG. 5, detachable handle 12 is tilted downward and brought toward side handle 16 of receptacle 14, so that notch 56 engages bar 44 of side handle 16. Handle 12 is then rotated about bar 44 to raise upper surface 54 of vessel engaging portion 48 and latch 58 to opening 40. As upper surface 54 and latch 58 are inserted into opening 40, side handle 16 contacts upper concave portion 65 of latch 60 and compresses spring 72, allowing latch 60 to move toward front face 64 of vessel engaging portion 48. Once upper portion 65 of latch 60 clears opening 40, spring 72 returns to its relaxed state in which latch 60 is biased away from front face 64 of vessel engaging portion 48, as shown in FIG. 2. Groove 68 of latch 60 automatically contacts ledge 42 of side handle 16 and prevents handle 12 from accidentally detaching from receptacle 14.

The removal of handle 12 from receptacle 14 is not automatic, and thus, requires an additional step. As illustrated in FIG. 4, the user must depress latch 60 in the direction indicated by arrow A to overcome the force of spring 72. While latch 60 contacts front face 70 of vessel engaging portion 48, handle 12 is rotated about bar 44, enabling convex upper portion 65 of latch 60 and upper surface 54 to pass through opening 40. Handle 12 may then be removed from side handle 16 by disengaging notch 56 from bar 44.

As illustrated in FIGS. 6–9, vessel 10 is provided with receptacle 14 and a detachable handle 74 in accordance with a second embodiment of the invention. Detachable handle 74 may be attached directly to side wall 20 of receptacle 14 by engaging a pair of openings 76 (FIG. 9) which are located proximate rim 28 of side wall 20. Detachable handle 72 includes an elongate member 78 and a vessel engaging portion 80. Elongate member 78 has first and second ends 82 and 84, respectively. Vessel engaging portion 80 is attached to first end 82 of elongate member 78. Handle 74 is preferably made of a durable plastic material, with vessel engaging portion 80 and elongate member 78 integrally formed. However, vessel engaging portion 80 may also be secured to elongate member 78 by a mechanical fastener.

Vessel engaging portion 80 of detachable handle 74 has top and bottom faces 86 and 88, respectively, and a front end 90. Mounted to bottom face 88 of vessel engaging portion 80 are a pair of arms 92. Each arm 92 has a first end 94 which is attached to vessel engaging portion 92 and a second end 96 from which projects a prong 98. First end 94 of arm 92 may be attached to vessel engaging portion 92 by a mechanical fastener (not shown).

Arms 92 and prongs 98 extend past front end 90 of vessel engaging portion 92. Prongs 98 are spaced apart from each other by a distance approximately equal to that of openings 76 in side wall 20. In addition, prongs 98 have dimensions slightly smaller than those of openings 76, enabling prongs 98 to fit snugly in respective openings 76.

Figure 8:
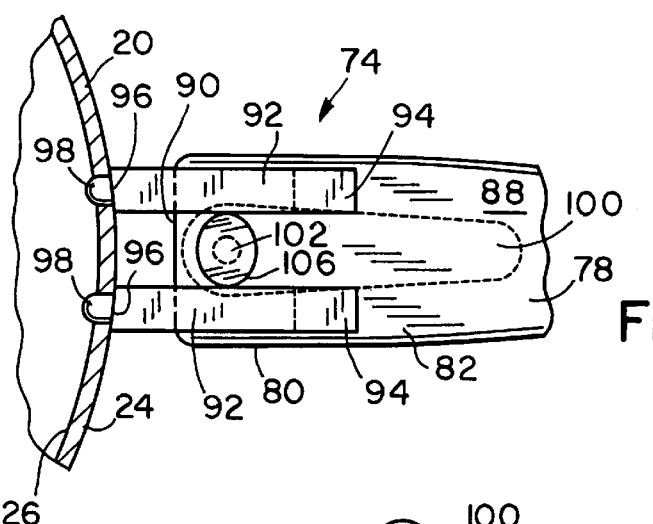
FIG. 8 is a cross-sectional view taken generally along line 8—8 of FIG. 7.

Detachable handle 74 further includes a lever 100 mounted to top face 86 of vessel engaging portion 80 proximate front end 90. As best shown in FIG. 8, lever 100 is mounted on a pin 102 which extends through vessel engaging portion 80. Lever 100 and pin 102 are rotatable with respect to vessel engaging portion 80, as will be described in greater detail below.

Figure 9:
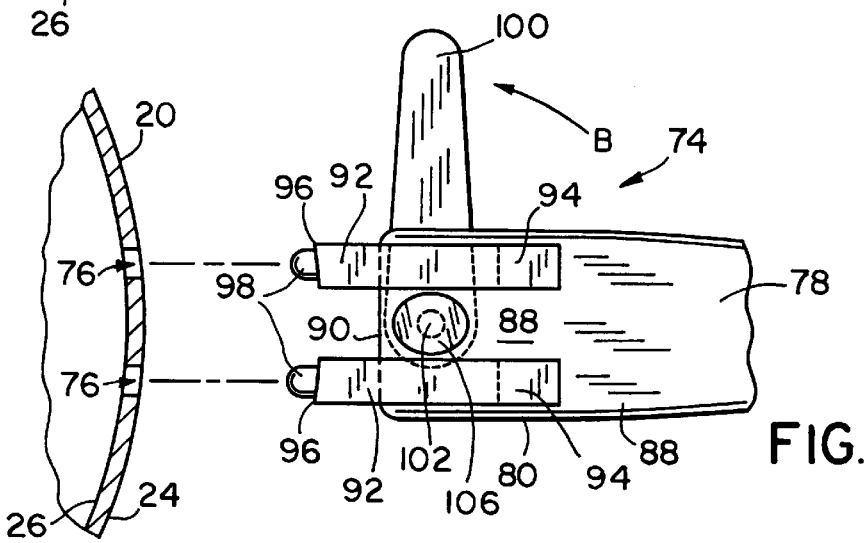
FIG. 9 is a view of the cooking vessel shown in FIG. 8, with the handle removed from the vessel.

Pin 102 is also connected to a cam 106 which is disposed between arms 92 on bottom face 88 of vessel engaging portion 80. Cam 106 has an elliptical shape, with long and short axes of symmetry, and rotates with lever 100 relative to vessel engaging portion 80. As illustrated in FIG. 8, cam 106 is aligned with lever 100 such that when lever 100 is parallel to elongate member 78, the long axis of symmetry of cam 106 is perpendicular to elongate member 78. In this position, cam 106 engages arms 92 to bias arms 92 away from each other. When lever 100 is transverse to elongate member 78, the short axis of symmetry is perpendicular to elongate member (FIG. 9). Since cam 106 does not engage arms 92 when lever 100 is transverse to elongate member 78, arms 92 are in their normal, relaxed position.

Vessel engaging portion 80 further includes a pair of protuberances 104 mounted on top face 86. Protuberances 104 are disposed on opposite sides of lever 100 and maintain lever 100 parallel to elongate member 78.

Thus, detachable handle 74 is operated as follows. To attach handle 74 to receptacle 14, the lever 100 is rotated in the direction indicated by arrow B in FIG. 9 until lever 100 extends transverse to elongate member 78. With arms 92 in their normal, relaxed position, prongs 98 of handle 74 are inserted into respective openings 76 in side wall 20 of receptacle 14 until second end 96 of arms 92 contacts outer face 24 of side wall 20. Lever 100 is then rotated over protuberance 104 and into alignment with elongate member 78. As lever 100 is rotated into alignment with elongate member 78, cam 106 engages arms 92 to spread arms 92 and attached prongs 98 apart. The tension between prongs 98 and respective openings 76 is sufficient to secure handle 74 to receptacle 14. Since protuberances 104 retain lever 100 in alignment with elongate member 78, handle 74 cannot be accidentally separated from receptacle 14.

To detach handle 74 from receptacle 14, the user must apply a force to rotate lever 100 over protuberance 104. Once lever 100 is transverse to elongate member 78, cam 106 no longer contacts arms 92, and the tension between prongs 98 and openings 76 is eliminated. Handle 74 may then be removed from openings 76 of receptacle 14.

It will be understood that the foregoing description is of a preferred embodiment of this invention and that the invention is not limited to the specific forms shown or described. For example, while the preferred embodiments of the handles 12 and 74 have an integrally formed elongate member and vessel engaging portion, elongate member and vessel engaging portion may be made of two or more pieces, including a separate grip portion. In addition, while the locking mechanism of the first embodiment includes a latch biased by a torsional spring, other mechanisms may employed. Furthermore, the handle of the second embodiment may include more than two prongs and an appropriately shaped cam. These and other modifications may be made in the design and arrangement of other elements without departing from the scope of the invention as expressed in the appended claims.

What is claimed is:

1. A vessel for cooking or baking, comprising:
   a receptacle including an upwardly extending side wall and a side handle attached to the side wall, the side handle having a top face and a bottom face and an attachment opening extending therethrough between the top and bottom faces; and
   a detachable handle removably coupled to the side handle, the detachable handle including:
   a hand grip member;
   a locking mechanism, and
   a vessel engaging portion coupled to the hand grip member and having an engagement surface adapted to engage a portion of the side handle,
   wherein the locking mechanism and the vessel engaging portion automatically secure the detachable handle to the receptacle when the engagement surface engages the portion of the side handle and the locking mechanism mates with the top face of the side handle, wherein the locking mechanism includes a latch portion pivotally attached to the vessel engaging portion for pivotal movement about a pivot axis, the latch portion engaging the top face of the side handle when the detachable handle is secured to the receptacle.

2. The vessel as recited in claim 1, wherein the engagement surface is curvilinear.

3. The vessel as recited in claim 1, wherein the pivot axis is below the bottom face of the side handle when the detachable handle is secured to the receptacle.

4. The vessel as recited in claim 1, further including a spring disposed between the latch portion and the vessel engaging portion.

5. The vessel as recited in claim 1, wherein an upper surface of the vessel engaging portion and an upper surface of the latch portion substantially fill the attachment opening at the top face of the side handle.

6. A vessel for cooking or baking, comprising:
   a receptacle including an upwardly extending side wall and a side handle permanently attached to the side wall and extending generally radially outward therefrom, the side handle having a top face, a bottom face, and an opening extending therethrough from the top face to the bottom face; and
   a detachable handle removably coupled to the side handle, the detachable handle including:
   a hand grip member;
   vessel engaging portion; and
   a releasable locking mechanism movable with respect to the vessel engaging portion, the releasable locking mechanism including a latch portion,
   wherein the releasable locking mechanism and the vessel engaging portion are disposed for upward insertion through the opening such that upon sufficient insertion the latch portion engages the top face to prevent inadvertent detachment.

7. The vessel as recited in claim 6, wherein the vessel engaging portion includes an engagement surface for engaging a first end of the side handle.

8. The vessel as recited in claim 7, wherein the engagement surface is curvilinear to mate with the first end of the side handle, thereby allowing the detachable handle to pivot about the first end of the side handle as the vessel engaging portion is inserted upwardly through the opening of the side handle.

9. The vessel as recited in claim 6, wherein the latch portion is pivotally coupled to the vessel engaging portion for pivotal motion about a pivot axis.

10. The vessel as recited in claim 9, wherein the pivot axis is below the bottom face of the side handle when the detachable handle is secured to the receptacle.

11. The vessel as recited in claim 6, wherein the releasable locking mechanism includes a spring disposed between the latch portion and the vessel engaging portion.

12. The vessel as recited in claim 6, wherein the side handle is attached to the side wall of the receptacle at a second end of the side handle.

13. The vessel as recited in claim 6, wherein the vessel engaging portion includes a convex upper surface adapted to be inserted through the opening.

14. A detachable handle for a vessel having a side handle attached thereto, the side handle having a top face and a bottom face and an opening extending therebetween, the detachable handle comprising:
   a hand grip member;
   a vessel engaging portion coupled to the hand grip member; and a releasable locking mechanism movable with respect to the vessel engaging portion, wherein the vessel engaging portion and the releasable locking mechanism are adapted to be upwardly inserted through the opening such that upon sufficient insertion the releasable locking mechanism is adapted to engage the top face of the side handle to prevent inadvertent detachment.

15. The detachable handle as recited in claim 14, wherein the vessel engaging portion includes an engagement surface, whereby the engagement surface is adapted to engage a first end of the side handle.

16. The detachable handle as recited in claim 15, wherein the engagement surface is curvilinear.

17. The detachable handle as recited in claim 14, wherein the releasable locking mechanism includes a latch portion adapted to engage the top face of the side handle.

18. The detachable handle as recited in claim 17, wherein the latch portion is pivotally coupled to the vessel engaging portion for pivotable movement about a pivot axis.

19. The detachable handle as recited in claim 14, wherein the vessel engaging portion includes a convex upper surface adapted to be inserted through the opening.

* * * * *